Oct. 1, 1935.   F. HANLAN   2,015,896
SOLDERLESS CONNECTER LUG FOR CABLES AND THE LIKE
Filed Aug. 20, 1934
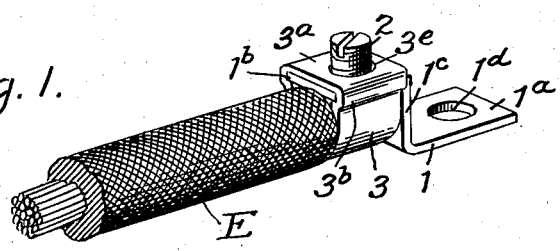
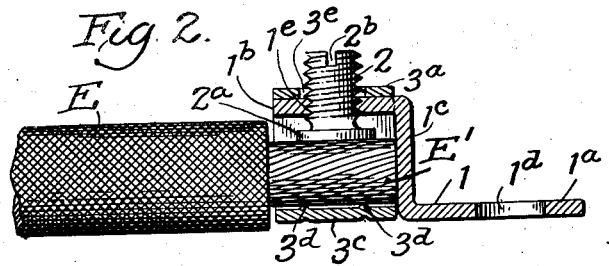
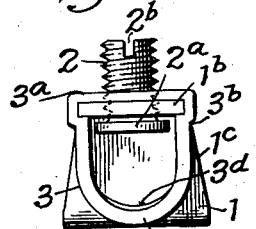
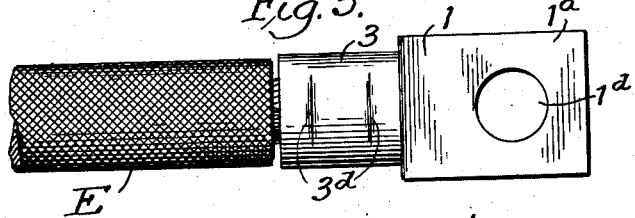
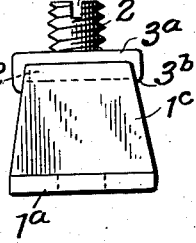
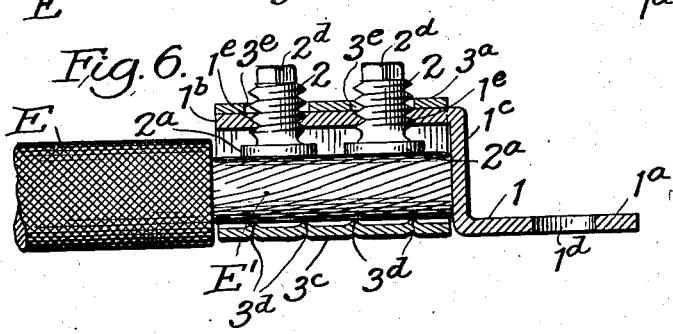
Inventor
Frederick Hanlan
By Alexander Howell
Attorneys Patented Oct. 1, 1935

2,015,896

UNITED STATES PATENT OFFICE 2,015,896

SOLDERLESS CONNECTOR LUG FOR CABLES AND THE LIKE

Frederick Hanlan, Battle Creek, Mich., assignor to H. B. Sherman Manufacturing Company, Battle Creek, Mich., a corporation of Michigan Application August 20, 1934, Serial No. 740,704

3 Claims. (Cl. 173—269)

This invention is a novel solderless lug or connector and method of making same. My connector is particularly adapted for binding electrical conductors or cables to terminals and the like, but is also readily adaptable for connecting other cables, cords, or ropes to fixtures or supports. The principal object of the invention is to provide a lug or connector of the above type which may be attached directly to the conductor or cable without requiring soldering, and is frictionally secured to the cable or conductor by the use of a non-removable screw or screws. My connector is symmetrical in design, simple and economical to manufacture, and conforms to the requirements of the Underwriter's Laboratories.

Heretofore lugs or connectors have been usually secured to the cables or conductors by soldering the ends of the cable into bores in the lugs; but there has developed a demand for a safe and practical lug which may be applied without solder, and my novel connector is unique in construction and designed to meet the requirements of simplicity and economy in manufacture and may be easily and quickly applied to the conductor or cable and insures a safe strong connection.

I will first explain the invention with reference to the accompanying drawing which illustrates several practical embodiments thereof, to enable others to adopt and use the same; and then summarize in the claims the novel features of construction, and novel combinations of parts, for which protection is desired.

In said drawing:—

Fig. 1 is a perspective view of one of my novel solderless connectors applied to the end of an electrical cable or conductor.

Fig. 2 is an enlarged longitudinal section through the connector as applied to a cable or conductor.

Fig. 3 is a bottom plan view of Fig. 2.

Fig. 4 is an end view of the connector detached from the cable looking into the sleeve.

Fig. 5 is an end view looking at the opposite end of the connector.

Fig. 6 is a sectional view similar to Fig. 2, showing a modified form of the connector.

As shown in the drawing my novel lug or connector preferably comprises a connecting piece 1 formed of a single piece of metal, preferably copper, having oppositely extending end portions 1a, 1b and an intermediate portion 1c disposed at an angle to the parallel end portions. In one end portion 1a is a bore or opening 1d whereby the connecting piece 1 may be attached to a terminal or other support (not shown) in the usual manner. In the opposite end portion or shank 1b is a tapped bore 1e (Fig. 2) in which is engaged a binding screw 2, hereinafter described.

The shank end 1b is entered within a band or sleeve 3 which may be made either from tubing or drawn from sheet metal, said sleeve (when the parts are finally assembled) having a flat portion 3a adapted to fit on the shank 1b of piece 1, and the sides of the sleeve are pinched or bent in (as at 3b) under the shank 1b so as to retain the sleeve and shank in fixed relation (Figs. 1 and 2). The lower portion of the sleeve 3 is preferably rounded as at 3c, and in the rounded portion 3c may be formed one or more inwardly projecting transverse ribs or corrugations 3d adapted to engage the bared end E' of the electrical conductor or wire E, and assist in holding the end of the wire in the connector.

In the upper end of the sleeve 3 is an opening 3e somewhat larger in diameter than the tapped bore 1e of shank 1b, and through opening 3e screw 2 projects. The screw 2 prevents longitudinal movement of the sleeve 3 on the shank 1b.

In the tapped bore 1e of the shank and extending through the enlarged bore 3e of sleeve 3 is a headless screw 2 which is inserted into bore 1e from the underside of the shank 1b before the sleeve 3 is mounted on the shank. The lower end of screw 2 is enlarged as at 2a to form a broad flat contact surface with the bared end of the cable E, and to prevent the screw from being withdrawn from the shank 1b when engaged with sleeve 3 as hereinafter explained. The upper end of the screw may be provided with a slot 2b for engagement with a screw-driver or other tool (Figs. 1–5), or with a non-circular portion 2d (Fig. 6) for engagement with a wrench.

The enlargement 2a is slightly smaller in diameter than the width of the sleeve 3 so that when the sleeve is crimped as at 3b under the sides of the shank 1b the enlargement will effectively prevent the screw from becoming disengaged from the shank as the enlargement will strike the contracted portion 3c of the sleeve. Hence the screw 2 is non-removable after assembly of the parts. Hence the crimping of the sides of the sleeve performs the double function of locking the shank to the sleeve, and of narrowing the width between sides of the sleeve while at the same time necessarily foreshortening the sleeve. The screw 2 is of minimum length and has a head on its inner end slightly smaller in diameter than the width between sides of the sleeve after crimping, so that when the screw is turned in one direction the head will contact with the walls of the sleeve adjacent the rounded outer portion 3c before the screw becomes disengaged from the bore of the shank, thereby preventing removal of the screw from the sleeve after crimping, although before crimping and before corresponding foreshortening of the sleeve the parts could be assembled as hereinafter specified.

Screw 2 is preferably of brass or bronze, and if desired may be necked between the portion 2a and the threaded portion, as shown in the drawing. It also might have a square, octagon or hexagon head 2d (Fig. 6) instead of a slot 2b (Fig. 2) so that it could be applied with a wrench instead of a screw-driver; but in any case, the head would be no larger than the root of the thread to permit its insertion through opening 3e of the sleeve in assembling the connector.

In Fig. 6 a modification is shown in which the shank portion 1b is increased in length, as is also the sleeve 3; and a plurality of screws 2 are utilized instead of a single screw as in Fig. 1.

The corrugations or ribs 3d in the sleeve are for the purpose of preventing the wire or cable from slipping, and hence increase the holding power. These might in practice be of different shape or location, or may be omitted altogether; also the exact cross-sectional shape of the sleeve might be varied somewhat from that shown in the drawing.

In assembling the connector, after the parts have been formed, the screw 2 is inserted from below into the threaded bore 1e in the shank 1b. Sleeve 3 is then slipped over the shank 1b with the screw 2 projecting through opening 3e, then the sleeve is fastened to the shank by the application of pressure to pinch or crimp the sleeve under the sides of the shank 1b, as indicated at 3b. Thus the shank is held firmly within the sleeve. The portion 1c of the connecting piece 1 closes one end of the sleeve 3, as shown in Figs. 2 and 6, and thereby enhances the appearance of the connector lug.

My device provides a solderless connector which is symmetrical in design, simple and economical in manufacture, and one of the important features of which is the provision of the non-removable screw 2. The diameter of the head 2a on the bottom of the screw 2, which prevents its removal from the sleeve, is slightly less than the inside width of the sleeve 3. The body of the screw 2 is preferably large in diameter in order to secure strength.

The connector will be made in various sizes to suit various sizes of cable but any size connector will engage several varying diameters of conductors or cables, as the binding screw 2 will follow through and bind a smaller cable than that for which the connector was normally intended. The length of the shank 1b where the bolted contact is secured may vary, and also the length of the sleeve 3 might vary in proportion as requirements develop; and the lug may contain more than one screw 2, as shown in Fig. 6.

I claim:—

1. That method of forming connectors for cables and the like, consisting in forming a member having a threaded bore; forming a sleeve with an opening corresponding with the threaded bore of the member; inserting a screw in the said bore, said screw having an enlarged head on its inner end; assembling such sleeve and shank by entering the member into the sleeve, the projecting end of the screw extending through the opening in the sleeve; and then crimping the sleeve under and against the side edges of the member to lock the sleeve thereon; the head of the screw by contacting with the narrowed and foreshortened walls of the sleeve preventing removal of the screw from the connector in the inward direction after the parts are thus assembled; the head of the screw preventing removal of the screw in the outward direction.

2. A connector comprising a member having a bore; a seamless sleeve surrounding said member and having an opening in one side registering with the bore in the member; means for maintaining the member against the side of the sleeve having the opening therein; and a headless screw in the bore projecting through said opening and adapted to bind the end of a cable inserted in the sleeve below the member, said screw having an enlargement on its inner end preventing removal of the screw in the outward direction, the length of the screw being such that when screwed in the inward direction the enlargement will contact with the walls of the sleeve and prevent removal of the screw from the connector.

3. A connector comprising a member having a bore and having side edges; a seamless sleeve surrounding said member and having an opening in one side registering with the bore in the member; the sides of the sleeve being crimped under and along the side edges of said member; and a headless screw in the bore projecting through said opening and adapted to bind the end of a cable inserted in the sleeve below the member, said screw having an enlargement on its inner end to prevent removal of the screw in the outward direction, the length of the screw being such that when screwed in the inward direction the enlargement will contact with the walls of the sleeve and prevent removal of the screw from the connector after the parts are assembled.

FREDERICK HANLAN.